United States Patent
Gaeddert et al.

(10) Patent No.: US 6,752,261 B1
(45) Date of Patent: Jun. 22, 2004

(54) BELT CONVEYOR SIDE RAIL

(75) Inventors: Thomas J. Gaeddert, Newton, KS (US); Paul Svoboda, Newton, KS (US)

(73) Assignee: Bunting Magnetics Co., Newton, KS (US)

( * ) Notice: Subject to any disclaimer, the term of this patent is extended or adjusted under 35 U.S.C. 154(b) by 0 days.

(21) Appl. No.: 10/322,865

(22) Filed: Dec. 18, 2002

(51) Int. Cl.$^7$ ............................................. B65G 21/00
(52) U.S. Cl. ................. 198/861.1; 198/813; 193/35 TE
(58) Field of Search ............................. 198/813, 861.1; 193/35 TE

(56) References Cited

U.S. PATENT DOCUMENTS

| | | | | | |
|---|---|---|---|---|---|
| 284,723 | A | * | 9/1883 | Colahan | 198/813 |
| 293,383 | A | * | 2/1884 | Wagner | 198/813 |
| 387,727 | A | * | 8/1888 | Middleton | 198/813 |
| 1,347,121 | A | * | 7/1920 | Rice | 198/813 |
| 5,156,261 | A | * | 10/1992 | Dorner | 198/816 |
| 5,632,372 | A | * | 5/1997 | Steinbuchel, IV et al. | 198/813 |
| 5,947,264 | A | * | 9/1999 | Eltvedt | 198/816 |
| 6,298,981 | B1 | * | 10/2001 | Hosch et al. | 198/813 |

* cited by examiner

*Primary Examiner*—Richard Ridley
(74) *Attorney, Agent, or Firm*—Kenneth H. Jack; Davis & Jack, LLC

(57) ABSTRACT

A conveyor side rail consisting of a rack and pinion assembly; a first side rail section having lateral sides, having a longitudinal end, and having a hollow space between the lateral sides, the rack and pinion assembly being housed within the hollow space, the hollow space opening laterally for application of torque for pinion rotation, the hollow space further opening longitudinally for alternate rack extension and retraction; a second side rail section having a longitudinal end; a telescoping slide channel and slide ridge assembly interconnecting the first and second side rail sections, the slide channel and slide ridge assembly aligning the first and second side rail sections so that the hollow space's longitudinal opening faces the second side rail section's longitudinal end; and a releasable lock further interconnecting the first and second side rail sections.

10 Claims, 4 Drawing Sheets

BELT CONVEYOR SIDE RAIL

FIELD OF THE INVENTION

This invention relates to apparatus and assemblies for article conveying. More particularly, this invention relates to continuous loop belt conveyors.

BACKGROUND OF THE INVENTION

A continuous loop belt of a common belt conveyor is typically driven and guided by a pair of cylindrical spindles which are spaced apart a distance approximately equal to one-half of the circumferential length of the belt. Such paired conveyor spindles are commonly rotatably mounted upon a support structure comprising parallel side rails, the side rails and cross spanning spindles forming a conveyor frame.

Such common belt conveyor preferably further comprises means for alternately extending and retracting the spindles away from and toward each other, and means for rotating the spindles about their vertical or yaw axes (i.e., axes which are perpendicular to the longitudinal axis of the conveyor, and which are perpendicular to the spindles' axes of rotation) are preferably provided. By facilitating alternate extension and retraction, such means allows the side rail and spindle assembly to place the continuous loop belt under tension during operation, and allows such continuous loop belt to be alternately released for disassembly and replacement. By facilitating rotation about yaw axes, such means allows the spindles to be angularly positioned for belt tracking, preventing lateral drifting of the belt during operation.

The above described means for spindle extension, retraction, and belt tracking typically comprises rectilinear motion actuators which are connected operably to the conveyor's side rails and spindles, and which are adapted for selectively altering the effective spindle to spindle length of the conveyor, or adapted for rotating one or both of the spindles about their yaw axes. For purposes of compactness and exterior space economy of such common belt conveyor, the rectilinear motion actuator is known to be mounted within the interior space between the conveyor's lateral side rails, and between the conveyor's bed and the lower flight of the conveyor's closed loop belt. Such positioning of the rectilinear actuators advantageously avoids space consuming upward, downward, or laterally outward structural protrusions. However, various assemblies associated with belt conveyors are known to be advantageously mounted within the interior space between the conveyor's side rails, bed and lower belt flight. For example, where the belt conveyor is adapted for air cushioned or vacuum assisted conveying, air ducts and plenums commonly occupy such space. As another example, magnet assemblies are commonly mounted within such space for prevention of slippage of ferrous articles carried by the belt. As a further example, heating apparatus may be advantageously installed within such interior space for application of heat to conveyed articles.

Where the above described rectilinear motion actuators protrude into or occupy portions of the interior space between the conveyor's side rails, bed, and lower belt flight, the actuators tend to undesirably interfere with or prevent such advantageous known uses of such space.

The instant inventive conveyor side rail solves or ameliorates the conveyor space usage problems described above by positioning and mounting rectilinear motion actuating rack and pinion assembly in a manner promoting exterior space economy of the conveyor, avoiding any significant upward, downwardly, and outward structural protrusion, and in a manner preventing such assembly from occupying the interior space between the conveyor's side rails, bed, and lower belt flight.

BRIEF SUMMARY OF THE INVENTION

The instant inventive conveyor side rail comprises first and second side rail sections, the first side rail section necessarily having a hollow interior space adapted for receiving and operatively supporting a rack and pinion assembly. The pinion of the rack and pinion assembly preferably has oppositely and axially extending journals which are nestingly received by annular bearings which are housed and supported within the first side rail section's hollow interior space. Preferably, the lateral side wall surfaces of such space are molded or milled to include such annular bearings. Also preferably, the pinion is rotatably supported within the hollow space so that the pinion's axis of rotation is substantially perpendicular to the lateral sides of the first side rail section.

Necessarily, the first side rail section's hollow interior space has a first lateral opening, such opening facilitating application of rotational torque to the pinion. The first lateral opening is preferably configured circularly and is closely fitted to the outside diameter of one of the pinion's journals, such configuration allowing the first lateral opening to dually function for pinion rotating access, and as an annular bearing.

The side of the pinion which is exposed to the first lateral opening preferably comprises rotating means, preferably comprising an axially aligned non-circular aperture. Suitably, such aperture is hexagonally shaped for nesting receipt of an allen head wrench. Suitably, such laterally exposed side of the pinion may alternately comprise an outwardly protruding prismatic lug for application of rotating torque via a common socket wrench.

The hollow interior space between the lateral sides of the first side rail section preferably further comprises a longitudinally extending chamber fitted for sliding receipt of a rack, such longitudinal chamber being positioned to facilitate operative engagement of the teeth of the rack with the teeth of the pinion. Necessarily, the longitudinal chamber extends to and opens at one of the longitudinal ends of the first side rail section.

Preferably, the first side rail section's hollow interior space further opens oppositely from the above described first lateral opening, such opposite opening providing access to the pinion and rack chambers of the hollow interior space for assembly, disassembly, and maintenance of the rack and pinion assembly. A rack and pinion retaining plate preferably covers such opposite or second lateral opening, such plate preferably being removably attached by means of screws. Like the opposite lateral wall of the hollow interior space, the rack and pinion retaining plate preferably presents annular bearing surfaces for nesting receipt and rotatable support of the pinion.

In operation of the above described preferred embodiment of the first side rail section, the driving head of an allen wrench is inserted into the pinion's hexagonal aperture via the hollow interior space's first lateral opening. Thereafter, the allen wrench may be alternately rotated and counter rotated, applying rotational torque to the pinion, and causing the pinion to rotate and counter rotate against the rack, alternately extending and retracting an end of the rack from and into the hollow interior space's longitudinal opening.

The instant inventive conveyor side rail necessarily further comprises a second side rail section and telescoping means which is adapted for interconnecting the first and second side rail sections, such means being further adapted for aligning the first and second side rail sections so that the longitudinal opening of the first side rail section's hollow interior space faces a longitudinal end of the second side rail section, and such means being further adapted for facilitating longitudinal telescoping motions of the first and second side rail sections toward and away from each other. According to the functions of the telescoping means, upon operation of the rack and pinion assembly to extend the rack, an end of the rack contacts the longitudinal end of the second side rail section, telescopingly extending the first side rail section away from the second side rail section. Opposite operation of the rack and pinion assembly to retract the rack, frees the first and second side rail sections for telescoping retraction toward each other.

Preferably, the telescoping means comprises an arm extending longitudinally from the first or second side rail sections, such arm supporting a longitudinally extending slide ridge, the slide ridge being nestingly and slidably received by a slide channel within the first or second side rail section. Where the longitudinally extending arm extends from one of the sections among the first and second side rail sections, the other section necessarily includes the slide channel which nestingly receives the slide ridge. When such arm alternately includes a slide channel, such other section necessarily supports the slide ridge. Suitably, the telescoping means may alternately comprise a slide shaft and slide channel assembly, or may comprise a slide slot and slide pin assembly.

Releasable locking means further interconnecting the first and second side rail sections are necessarily provided, such means being adapted for selectively and alternately fixing the first and second side rail sections in an extended position with respect to each other for maintenance of belt tension, and adapted for releasing the first and second side rail sections for retracting motion toward each other, slackening the belt and allowing disassembly and replacement of the belt. Preferably, the releasable locking means comprises a "T" nut clamp and "T" channel assembly, such assembly dually functioning as the above described telescoping means. Suitably, the releasable locking means may alternately comprise a clamping means selected from numerous other commonly known releasable clamping means such as a "C" clamps and set screw and slide bar assemblies. For quick release and clamping, levered cam locks may serve as a suitable substitute for screw actuated clamps.

The opposite longitudinal end of the first side tail section (i.e., the end which is opposite the longitudinal end which includes the hollow space's longitudinal opening) is preferably configured to include conveyor spindle mounting means, such means preferably comprising a spindle axle or a spindle axle receiving aperture. Said opposite longitudinal end may be suitably alternately configured to include means for mounting and longitudinally aligning a third conveyor side rail section. Suitably, the spindle mounting means may be alternately carried by the distal or opposite longitudinal end of the second side rail section, or by the distal or opposite end of such third side rail section.

In practice, a pair of the instant inventive conveyor side rails are preferably incorporated within a belt conveyor, the pair serving as a major structural components of the belt conveyor's frame. The inventive side rails allow the overall effective length of the conveyor to be alternately lengthened and shortened for alternate belt tensioning and belt releasing. Where a longitudinal end of at least one of such pair of inventive conveyor side rails comprises spindle mounting means, as described above, such at least one side rail may be individually manipulated for belt tracking adjustment.

Accordingly, an object of the instant invention is to provide a conveyor side rail capable of alternate lengthening and shortening through the action of a compactly mounted rectilinear motion actuator.

It is a further object of the present invention to provide such a conveyor side rail which promotes both exterior and interior space economy, and whose rectilinear motion actuator comprises a rack and pinion assembly occupying a hollow interior space within the side rail.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 2:
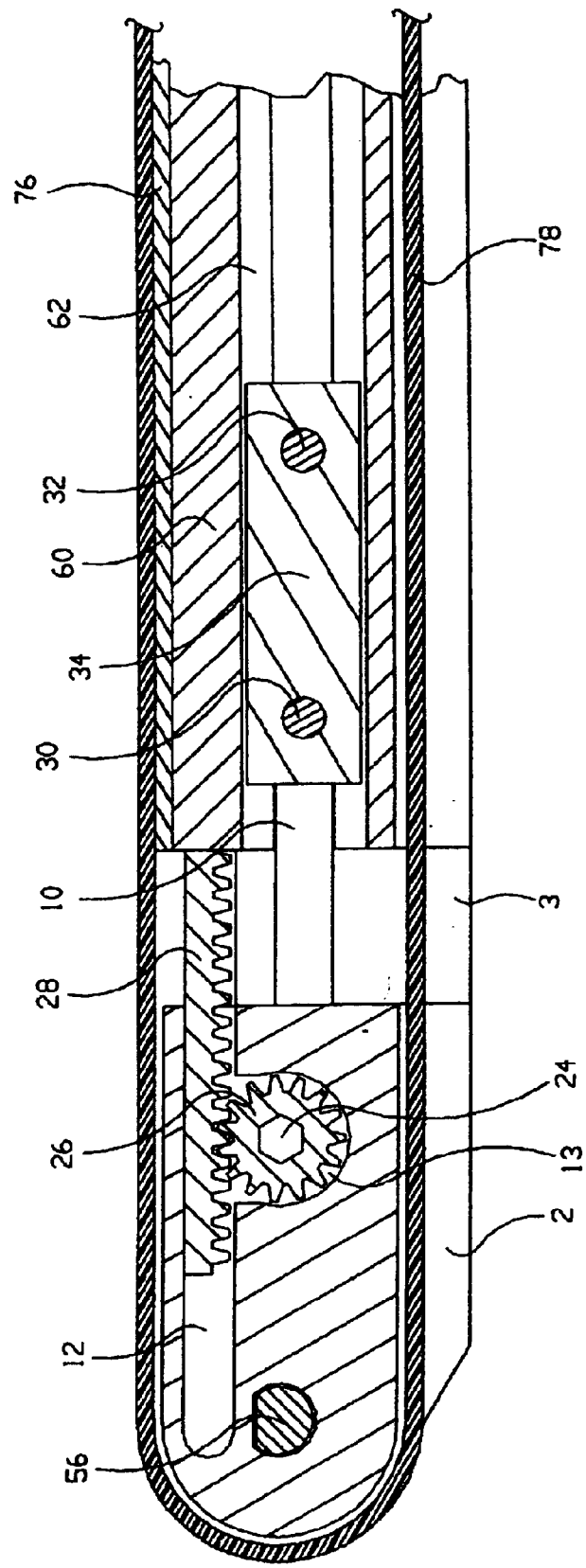
FIG. 2 is a sectional view as indicated in FIG. 1.
Figure 4:
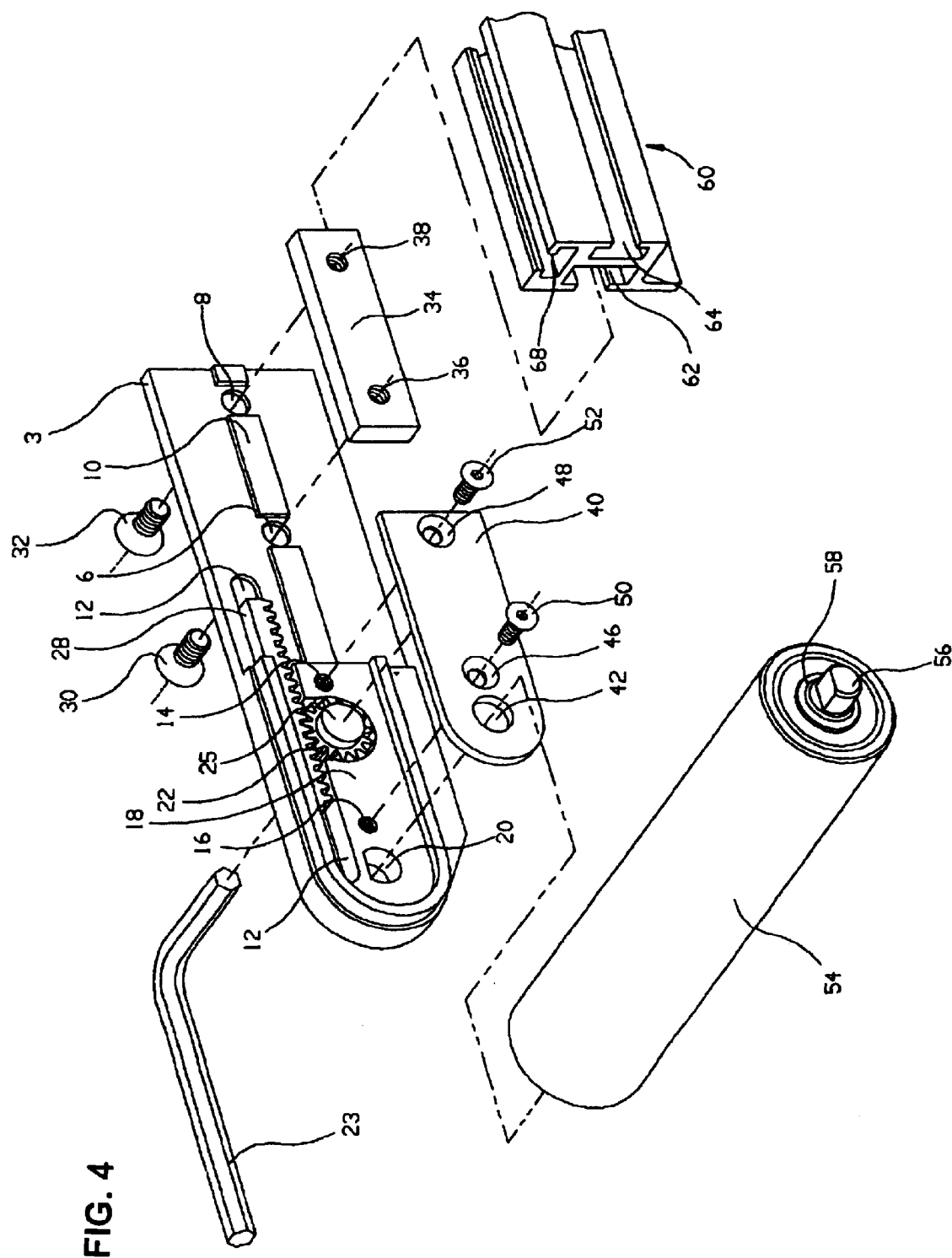
FIG. 4 is an exploded view of the instant inventive conveyor side rail.

Referring now to the drawings, and in particular simultaneously to FIGS. 2 and 4, the instant inventive conveyor side rail comprises a first side rail section 2, such section necessarily having a hollow interior space, such space preferably comprising a longitudinally extending rack receiving chamber 12 and a semi-circular and cylindrical pinion receiving chamber 13.

Figure 1:
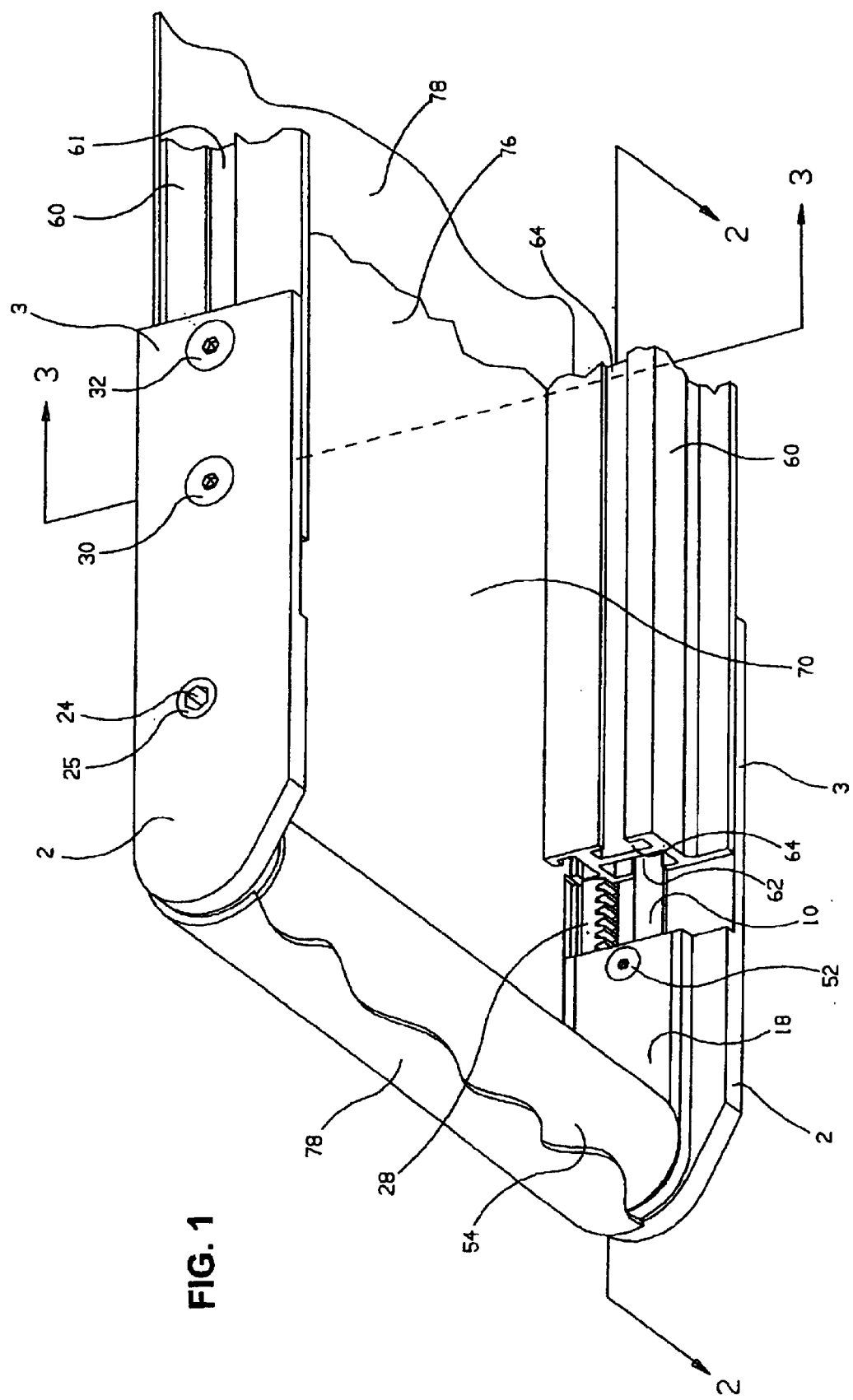
FIG. 1 is an isometric view of a pair of the instant inventive conveyor side rails, the view showing said pair supporting a conveyor spindle, a conveyor bed (shown in partial view), and a continuous loop belt (shown in partial view).

Referring simultaneously to FIGS. 1, 2, and 4, a pinion 26 within chamber 13 preferably has laterally and oppositely extending journals 25 and 27. Journal 25 preferably has a non-circular axially aligned opening 24 which is preferably fitted for nesting receipt of an allen wrench 23. Journal 25 also preferably extends laterally through a circular lateral opening 29 of chamber 13, such opening 29 dually functioning as a port for access to pinion 26 and as a rotational bearing for journal 25.

Referring further simultaneously to FIGS. 1, 2, and 4, a rack 28 is slidably mounted within chamber 12, the teeth of rack 28 intermeshing with and engaging the teeth of pinion 26. Chamber 12 necessarily has a longitudinal opening 31 for rack extension and retraction.

Referring further simultaneously to FIGS. 1, 2, and 4, a rack and pinion retaining plate 40 closes chambers 12 and 13, and mechanically retains pinion 26 and rack 28 within said chambers. Preferably, the surface of plate 40 opposite that in view in FIG. 4 forms an annular bearing surface for nesting receipt of and rotatable support of journal 27. Plate 40 is preferably removably attached to the first side rail section 2 by spirally threaded bolts 50 and 52, said bolts extending through plate apertures 46 and 48, and being threadedly mounted within helically threaded apertures 16 and 14.

In operation of the first side rail section 2, referring simultaneously to FIGS. 2 and 4, allen wrench 23 is inserted into hexagonal aperture 24 within pinion 26's journal 25. Clockwise rotation of allen wrench 23 rotates pinion 26 clockwise, extending rack 28 out of the longitudinal opening 31 of chamber 12. Alternately, counter clockwise rotation of allen wrench 23 retracts rack 28 into chamber through longitudinal opening 31.

Figure 3:
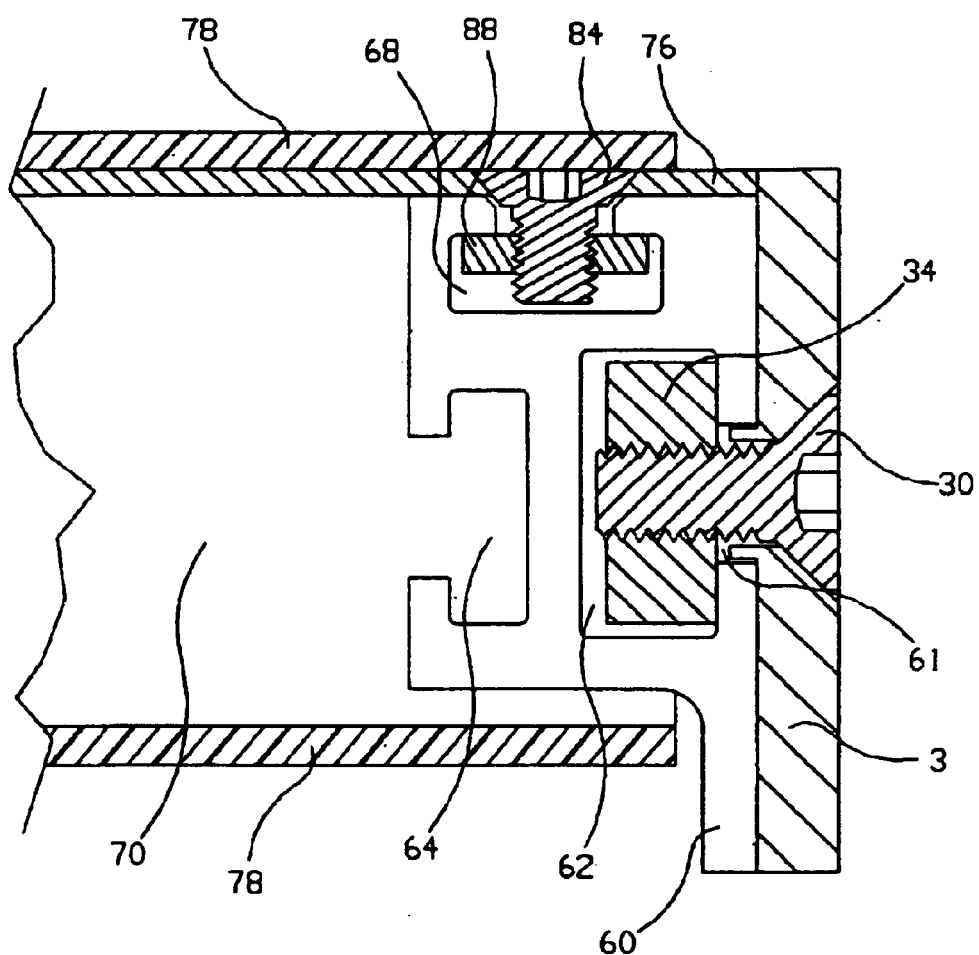
FIG. 3 is an alternate sectional view as indicated in FIG. 1.

Referring to FIG. 1, the first side rail section 2 is connected to a second side rail section 60 by telescoping means, such means preferably comprising a longitudinally extending arm 3, such arm 3 preferably having a laterally extending slide ridge 10, such ridge 10 being nestingly and slidably received by, referring further simultaneously to FIGS. 3 and 4, slide slot 61.

The instant inventive conveyor side rail necessarily further comprises releasable locking means which further interconnects the first and second side rail sections 2 and 60. Where the first and second side rail sections 2 and 60 are telescopingly moved to their longitudinally extended positions, as depicted in FIG. 1, spindles 54 place continuous loop belt 78 under tension. Absent a locking means, such tension would undesirably telescopingly move the first and second side rail sections toward each other, releasing the tension. Referring simultaneously to FIGS. 2, 3, and 4, a preferred releasable locking means comprises an internally helically threaded "T" nut 34, the "T" nut 34 being slidably mounted within a "T" channel 62 within the second side rail section 60, the slide slot 61 further functioning as an access way into "T" channel 62. Helically threaded bolts 30 and 32 extend through apertures 6 and 8 within longitudinally extending arm 3, and thence extend through slide slot 61 to threadedly engage helically threaded apertures 36 and 38 of "T" nut 34.

The lateral dimension of slide ridge 10 is necessarily less than the lateral dimension of slide slot 61 so that, upon tightening of helically threaded bolts 30 and 32, "T" nut 34 compresses against the inturned flanges of "T" channel 62, and sequentially press, according to the view of FIG. 4, the lateral outer surface of the second side rail section 60 against the lateral inner surface of longitudinally extending arm 3. Such configuration allows continued tightening of helically threaded bolts 30 and 32 to frictionally clamp and lock the first and second side rail sections 2 and 60 in a desired longitudinally extended orientation with respect to each other. Loosening of helically threaded bolts 30 and 32 allows "T" nut 34 to move slidably within "T" channel 62, and allows slide ridge 10, "T" nut 34, slide slot 61, and slide channel 62 to concurrently serve as the telescoping means.

Referring to FIG. 4, the opposite longitudinal end of the first side rail section 2 (i.e., the end which is opposite the end from which arm 3 extends) is preferably configured to include spindle mounting means, preferably comprising a non-circular aperture 20 and circular aperture 42, such apertures 20 and 42 being fitted for nesting receipt of a lateral end of spindle axle 56, the spindle 54 being rotatably mounted upon such axle 56 by means of bearings 58. Suitably, such opposite longitudinal end of side rail section 2 may be configured substantially identically with longitudinally extending arm 3, such configuration alternately allowing side rail sections substantially identical to the second side rail section 60 to extend from both longitudinal ends of the first side rail section 2.

Referring to FIG. 1, configuration of the first side rail section 2 to include both telescoping means and spindle mounting means at its opposite longitudinal ends is preferred because such configuration best facilitates use of the inventive conveyor side rail for both spindle extension and retraction and spindle tracking yaw angle adjustment.

Referring simultaneously to FIGS. 1 and 3, conveyor bed 76 is preferably removably attached to the second side rail sections 60 by combinations of helically threaded bolts 84, and helically threaded "T" nuts 88, the "T" nuts 88 being mounted within and clamping against inturned flanges of "T" channels 68.

Referring simultaneously to FIGS. 1, 2, and 3, the inner surfaces of the depicted pair of inventive conveyor side rails, in combination with the lower surface of conveyor bed 76, and in further combination with the upper surface of the lower flight of the continuous loop belt 78 defines a longitudinally extending interior space 70. Within such interior space 70, various auxiliary apparatus associated with article conveying, such as air plenums, magnet assemblies, and heaters, may be conveniently installed, the inwardly opening "T" channel 64 of the second side rail sections 60 providing a convenient mounting structure for installation of such apparatus. None of the structures associated with the above described rectilinear motion actuation, telescoping, and locking functions of the inventive conveyor side rails encroach or protrude into the interior space 70. By leaving such interior space 70 clear of obstructions, installation of such auxiliary apparatus is facilitated and the overall functionality of the belt conveyor is enhanced.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

We claim:

1. A conveyor side rail comprising:
   (a) a rack and pinion assembly;
   (b) a first side rail section having lateral sides, having a longitudinal end, and having a hollow space between the lateral sides, the rack and pinion assembly being housed within the hollow space, the hollow space opening laterally for application of torque for pinion rotation, the hollow space further opening longitudinally for alternate rack extension and retraction;
   (c) a second side rail section having a longitudinal end;
   (d) telescoping means interconnecting the first and second side rail sections, said means aligning said sections so that the hollow space's longitudinal opening opens toward the second side rail section's longitudinal end; and,
   (e) releasable locking means further interconnecting the first and second side rail sections.

2. The conveyor side rail of claim 1 further comprising spindle mounting means connected operably to the first side rail section or connected operably to the second side rail section.

3. The conveyor side rail of claim 2 wherein the spindle mounting means comprises an axle or an axle receiving aperture.

4. The conveyor side rail of claim 1 further comprising pinion rotating means connected operably to the rack and pinion assembly.

5. The conveyor side rail of claim 4 wherein the pinion rotating means comprises a non-circular aperture or a prismatic lug, said aperture or lug being accessible through the hollow space's lateral opening.

6. The conveyor side rail of claim 5 further comprising a wrench connectable operably to the non-circular aperture or connectable operably to the prismatic lug.

7. The conveyor side rail of claim 1 wherein the hollow space further opens oppositely from the hollow space's lateral opening, and further comprising a rack and pinion retaining plate removably covering said further opening.

8. The conveyor side rail of claim 1 wherein the telescoping means comprises a longitudinally extending slide channel operably connected to or formed wholly with the first or second side rail sections.

9. The conveyor side rail of claim 8 wherein the telescoping means further comprises a longitudinally extending slide ridge nestingly received by the longitudinally extending slide channel, the longitudinally extending slide ridge being operably connected to the first or second side rail sections.

10. The conveyor side rail of claim 9 wherein the longitudinally extending slide channel comprises a "T" channel, wherein the longitudinally extending slide ridge comprises a helically threaded "T" nut, and wherein the operable connection of the slide ridge to the first or second side rail sections and the releasable locking means comprise at least a first helically threaded bolt threadedly engaging the helically threaded "T" nut.

* * * * *